B. L. HOLLISTER.
CHECK BOOK.
APPLICATION FILED OCT. 12, 1917.
1,285,184.
Patented Nov. 19, 1918.
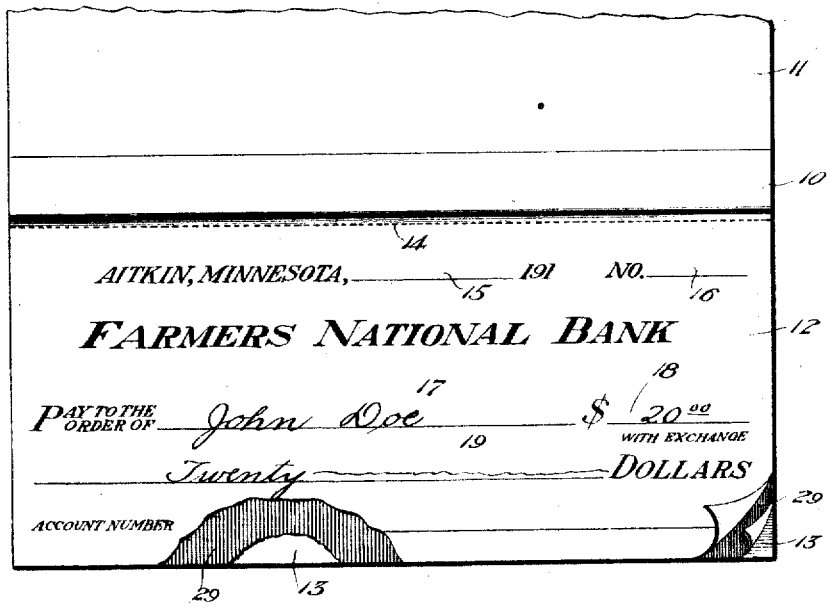
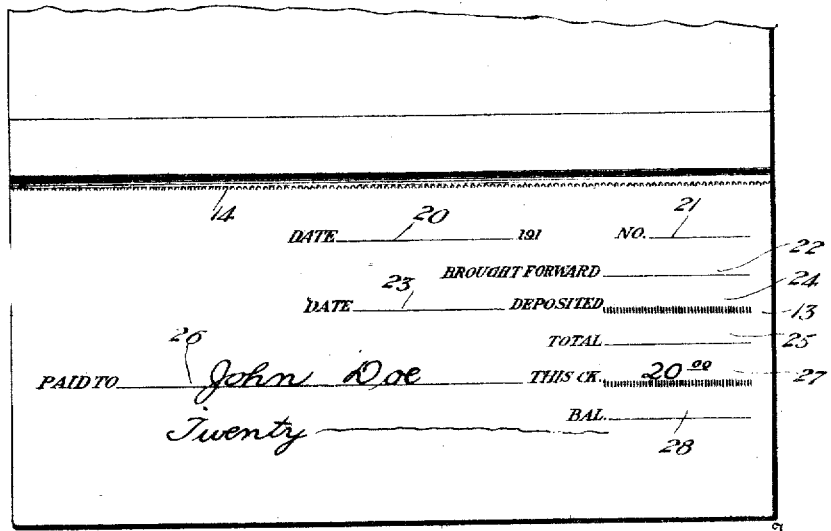

UNITED STATES PATENT OFFICE.

BYRON L. HOLLISTER, OF AITKIN, MINNESOTA.

CHECK-BOOK.

1,285,184.

Specification of Letters Patent.

Patented Nov. 19, 1918.

Application filed October 12, 1917. Serial No. 196,172.

*To all whom it may concern:*

Be it known that I, BYRON L. HOLLISTER, a citizen of the United States, and a resident of Aitkin, in the county of Aitkin and State of Minnesota, have invented a new and useful Improvement in Check-Books, of which the following is a specification.

My present invention relates generally to check-books, and more particularly to a check-book involving a novel arrangement and relation of checks and stub, in order to minimize the work required in filling out stubs, generally an entirely separate and distinct operation from the filling in of a check form.

More particularly, my object is the provision of a novel construction and arrangement in which the stubs are in the form of record blanks having a plurality of spaces in which the data usually present in check stubs is provided for, and certain of which, for check data, are in registry with the corresponding spaces of the check blanks.

A still further object of my invention is the provision of a small, compact check-book including a series of form pages in which check blanks and record blanks alternate throughout the series, and of which the check blanks alone are detachable, and of which the record blanks are permanent and provided with spaces registering with certain of the spaces of the check blanks, whereby written data in the spaces of the latter may be duplicated in the corresponding spaces of the former.

In the accompanying drawing, illustrating my invention and forming a part of this specification:

Figure 1 is a plan view of the book with its cover opened and broken away, and with its uppermost check blank also partly broken away, and Fig. 2 is a similar view with the uppermost check blank detached, showing in plan the next lowermost record blank.

Referring now to these figures, my invention contemplates the provision of a check-book generally indicated at 10, having a single series of form pages in regularly superposed relation from its back to its cover 11, the latter of which is turned back in the manner seen in the two figures, in order to reach the uppermost form page of the series.

In the series of form pages, check blanks 12, one of which is seen in Fig. 1, and record blanks 13, one of which is seen in Fig. 2, alternate throughout, the check blanks 12 having perforations along one edge as indicated at 14, whereby they may be readily detached, and the record blanks 13 being permanently mounted in the series.

Each of the check blanks 12 has the usual upper spaces 15 and 16, respectively, for the date and check number, and the usual lower spaces 17, 18 and 19, for the payee and the check amount in numerals and writing.

Each of the record blanks 13 as seen in Fig. 2, has spaces 20 and 21 for the date and check number, a space 22 for forwarded amount, spaces 23 and 24 for the date and amount of deposit, the latter of which is located below the space 22, a space 25 below the spaces 22 and 24, for the total of forwarded amounts and deposited amounts, spaces 26 and 27 for the payee and check amount, and the latter of which is below the space 25 for totals, and a space 28 below the space 27, for the balance after the amount of the check has been taken from the amount of the total of the forwarded and deposited amounts.

Furthermore, the spaces 20, 21, 26 and 27 for the date, number, payee, and amount of the check, are in registry with the corresponding spaces 15, 16, 17 and 18 of the check blank 12, so that by the use of a carbon or other transfer paper, a portion of which is seen at 29 in Fig. 1, between the check blank 12 and its corresponding record blank 13, the date of the check, the number thereof, the payee's name, and the amount of the check in numerals, may be duplicated upon the record blank 13 so that the time and work required in the filling out of the latter will be minimized to this extent.

It is obvious, furthermore, that my arrangement of alternating check blanks and record blanks throughout a single series of form pages enables me to construct a check book of a size corresponding to the full length of the check, and but slightly greater in width, in order to avoid the extreme length of check-books with stubs as now in use.

I claim:

A check-book having a single series of form pages in which detachable check blanks and permanent record blanks or stubs alternate throughout, said record blanks or stubs having marked spaces for the payee, date, check number, and check amount, spaces only of the check blanks in registry with the corresponding spaces of the check blank, and said record blanks or stubs having designated spaces for forwarded amounts, deposits, totals, and balances.

BYRON L. HOLLISTER.

Witnesses:
ANNA M. MAHLIN,
HENRY D. McNEIL.